(12) United States Patent
Agerstam et al.

(10) Patent No.: US 9,197,619 B2
(45) Date of Patent: Nov. 24, 2015

(54) MANAGEMENT OF MULTIPLE DEVICES REGISTERED TO A USER

(71) Applicants: Mats Agerstam, Portland, OR (US); Patrick C. Lankswert, Prospect, KY (US)

(72) Inventors: Mats Agerstam, Portland, OR (US); Patrick C. Lankswert, Prospect, KY (US)

(73) Assignee: INTEL CORPORATION, Santa Clara, CA (US)

( * ) Notice: Subject to any disclaimer, the term of this patent is extended or adjusted under 35 U.S.C. 154(b) by 151 days.

(21) Appl. No.: 13/801,281

(22) Filed: Mar. 13, 2013

(65) Prior Publication Data

US 2014/0068736 A1 Mar. 6, 2014

Related U.S. Application Data

(60) Provisional application No. 61/697,754, filed on Sep. 6, 2012.

(51) Int. Cl.
    *H04L 29/06* (2006.01)
    *H04W 12/06* (2009.01)
(52) U.S. Cl.
    CPC ............ *H04L 63/08* (2013.01); *H04L 63/0823* (2013.01); *H04W 12/06* (2013.01); *H04L 63/102* (2013.01)
(58) Field of Classification Search
    CPC ... H04L 63/08; H04L 63/0823; H04L 63/102; H04W 12/06
    See application file for complete search history.

(56) References Cited

U.S. PATENT DOCUMENTS

| | | | |
|---|---|---|---|
| 6,886,095 B1 * | 4/2005 | Hind et al. | 713/168 |
| 8,103,247 B2 * | 1/2012 | Ananthanarayanan et al. | 455/411 |
| 2005/0191990 A1 * | 9/2005 | Willey et al. | 455/411 |
| 2005/0235363 A1 | 10/2005 | Hibbard et al. | |
| 2006/0233133 A1 | 10/2006 | Liu et al. | |
| 2007/0002831 A1 | 1/2007 | Allen et al. | |
| 2008/0022103 A1 * | 1/2008 | Brown et al. | 713/175 |
| 2008/0168030 A1 | 7/2008 | Songer | |
| 2009/0193512 A1 * | 7/2009 | Buckley et al. | 726/9 |
| 2011/0047598 A1 * | 2/2011 | Lindley et al. | 726/4 |
| 2011/0258303 A1 * | 10/2011 | Nath et al. | 709/223 |
| 2011/0269425 A1 | 11/2011 | Drovdahl et al. | |
| 2012/0164947 A1 * | 6/2012 | Kammer et al. | 455/41.2 |

OTHER PUBLICATIONS

International Search Report and Written Opinion, mail date Oct. 22, 2013, PCT/ISA/210, PCT/ISA/220, PCT/ISA/237, total of 9 pages.

* cited by examiner

*Primary Examiner* — Robert Leung
(74) *Attorney, Agent, or Firm* — Pillsbury Winthrop Shaw Pittman LLP

(57) ABSTRACT

A system and method for managing electronic devices based on user identity information is presented. An authenticating entity authenticates and provides secure user identity data and a first electronic device. The first electronic device includes memory that stores first secure user identity data provisioned to the first electronic device and a communication module that discovers a second electronic device and initiates a wireless connection with the discovered second electronic device, in which the second electronic device is provisioned with second secure user identity data, logic that has the first and second electronic devices exchange and validate their respective first and second secure user identity data, and a discovery list that stores attributes of the second electronic device. Upon determining that the first and second electronic devices are associated with the same user, the logic adds self-property to the stored attributes of the second electronic device.

20 Claims, 3 Drawing Sheets

MANAGEMENT OF MULTIPLE DEVICES REGISTERED TO A USER

CROSS REFERENCE TO RELATED APPLICATIONS

The present Patent Application is based on, and claims priority to, U.S. Provisional Patent Application No. 61/697,754 filed on Sep. 6, 2012, the entire content of which is hereby incorporated by reference.

FIELD OF THE INVENTION

The present invention relates generally to communications, and more particularly, to the management of user communication devices.

BACKGROUND

Traditionally, communications, both wired and wireless, between electronic devices rest squarely on device-level connectivity. Such device-centric connectivity typically forces users to seek and determine specific attributes about the electronic devices they are intending to connect to, such as, for example, device/machine name, SSID, WiFi/Bluetooth device name, etc. These device attributes are often unintuitive and convoluted.

Moreover, in many instances, users may desire to connect to other users as opposed to connecting to a device. As such, there exists a need for a more user-centric, flexible, streamlined approach that enables users to establish/authenticate user identities that may then be provisioned to electronic devices of their choosing.

DETAILED DESCRIPTION

Figure 1:
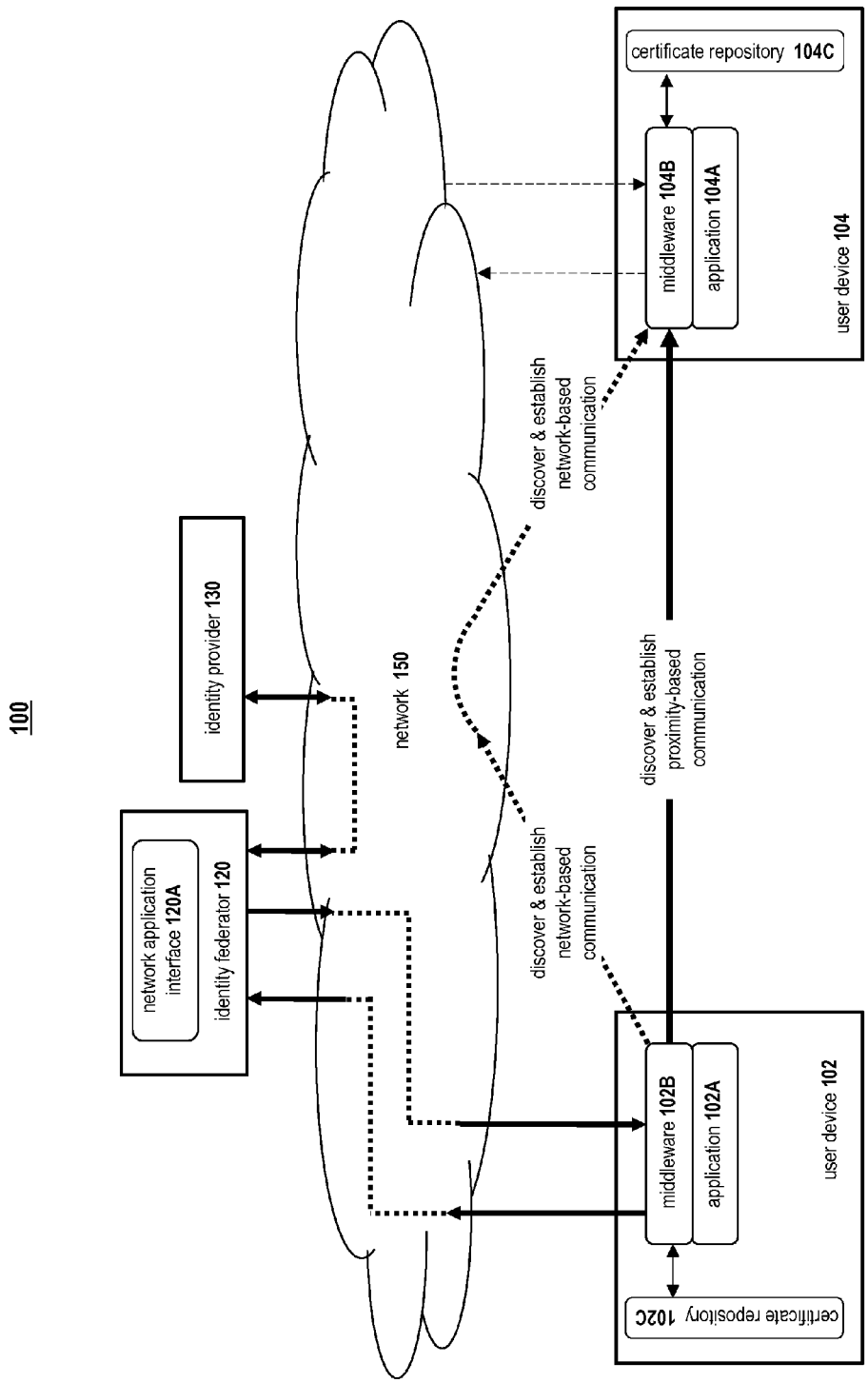
FIG. 1 depicts a functional block diagram of an identity management system for user devices, in accordance with various embodiments of the present disclosure.

In the description that follows, like components have been given the same reference numerals, regardless of whether they are shown in different aspects. To illustrate one or more aspect(s) of the present disclosure in a clear and concise manner, the drawings may not necessarily be to scale and certain features may be shown in somewhat schematic form. Features that are described and/or illustrated with respect to one aspect may be used in the same way or in a similar way in one or more other aspects and/or in combination with or instead of the features of the other aspects of the technology disclosed herein.

In accordance with various aspects of the present disclosure, a system for managing electronic devices based on user identity information is presented. The system includes an authenticating entity configured to authenticate users and provide secure user identity data based on user information and a first electronic device configured to wirelessly communicate with other electronic devices. The first electronic device includes: memory configured to store first secure user identity data provisioned to the first electronic device by the authenticating entity; a communication module configured to discover a second electronic device and initiate a wireless connection with the discovered second electronic device, the second electronic device provisioned with second secure user identity data; logic configured to have the first and second electronic devices exchange their respective first and second secure user identity data and validate the exchanged second secure user identity data; and a discovery list that stores attributes of the second electronic device based on the exchanged second secure user identity data. The logic further determines whether the first and second electronic devices are associated with the same user based on the exchanged second secure user identity data and, upon determining that the first and second electronic devices are associated with the same user, the logic adds self-property to the attributes of the second electronic device in the discovery list.

In accordance with various embodiments of the present disclosure, a method for managing electronic devices based on user identity information is also presented. The method includes provisioning a first electronic device with first secure user identity data provided by an authenticating entity; storing the first secure user identity data in memory of the first electronic device; discovering a second electronic device and initiating a wireless connection with the discovered second electronic device, the second electronic device provisioned with second secure user identity data; exchanging, by the first and second electronic devices, exchange their respective first and second secure user identity data; validating the exchanged second secure user identity data; storing attributes of the second electronic device based on the exchanged second secure user identity data in a discovery list; and determining whether the first and second electronic devices are associated with the same user based on the exchanged second secure user identity data. Moreover, upon determining that the first and second electronic devices are associated with the same user, adding self-property to the attributes of the second electronic device in the discovery list.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Turning now to the various aspects of the disclosure, FIG. 1 depicts a non-limiting example of a system, i.e., a system 100, directed to managing user identities for user devices, in which techniques for establishing and managing user identities for such devices described herein are implemented. In particular, system 100 is configured to enable user identities to be created/authenticated and then provisioned to electronic devices. In this manner, electronic devices may be able to identify and automatically recognize users' own electronic devices from a set of electronic devices discovered across a variety of network transport channels and effect communications and exchange data accordingly.

As such, system 100 may include first electronic device 102 and second electronic device 104 endeavoring to communicate with each other and exchange data in accordance with one or more applications 102A, 104A, respectively. For example, during the discovery phase, first electronic device 102 discovers second electronic device 104 and attempts to establish a communication link with user device 104. User electronic devices 102, 104 may take the form of mobile phones, tablet computers, personal computers, network servers, laptops, smartphones, gaming devices, networking devices, navigation device, wearable computing devices, communication-enabled appliances, etc.

As shown in FIG. 1, the discovery and communication processes may be proximity-based, such as, for example, through direct pairing, or network-based, such as, for example, attachment to network 150 via network access points. It will be appreciated that the discovery of peer devices and establishment of communications between such devices may operate under a variety of wireless communication protocols and standards, such as, for example, Wi-Fi, WiFi Direct, WiMax, WWAN, WLAN, WPAN, BlueTooth, BlueTooth Low Energy, Near Field Communications, or any other implementation of a suitable wireless standard. As such, the discovery and communications between first user device 102 and second user device 104 is not limited to any specific standard and the examples discussed may be implemented separately or in combination with each other.

As further indicated in FIG. 1, both user electronic devices 102, 104 include middleware modules 102B, 104B and secure user identification information (e.g., certificate) repositories 102C, 104C, respectively. Middleware modules 102B, 104B may comprise logic that facilitates the authentication of users and the provisioning of secure user identification information (e.g., certificate) that are stored in repositories 102C, 104C of devices 102, 104. Repositories 102C, 104C may comprise any type of nonvolatile memory.

In some embodiments, middleware modules 102B, 104B are configured to communicate with a trusted, network-based (e.g., cloud) service, such as identity federator 120, to authenticate users using an existing account on a social network or create a new account. Once the account has been created, or user has been authenticated using an existing account, the secure user identity information is provisioned to the device. For example, if an existing account from a social network provider (e.g., such as Facebook, LinkedIn, Twitter, etc.) is used for authentication, identity federator 120 would complete the authentication with the social network provider, then request to get the necessary user profile information from the social network provider such as, for example, name, verified email address, profile/avatar picture, and any other relevant information. This information may then be used to create a user account on identity federator 120.

By way of illustration, middleware modules 102B, 104B residing within user electronic devices 102, 104, may communicate with identity federator 120, via network 150, to determine whether there exists valid secure user identity information (e.g., certificate) associated with user electronic devices 102, 104. For the sake of clarity and illustration, FIG. 1 only depicts the communication lines between middleware module 102B of user device 102, identity federator 120, and identity provider 120. However, it is to be understood that such communications may equally occur between middleware module 104B of user device 104, identity federator 120, and identity provider 120.

Identity federator 120 may comprise servers, user information databases, and authentication platforms, etc. In addition, identity federator 120 may include network interface 120A that enables users to initiate the creation of account(s) as well as review their account(s) and corresponding information, such as seeing what electronic devices are associated/registered with the user, applications on the associated devices, addition/deletion of associated devices, status of secure user identity information, etc. It will be appreciated that interface 120A may take the form of a browser-compatible interface, such as HTTP or HTTPS, where an end user can directly access the identity federator for purposes of account management.

Moreover, network interface 120A may be configured to revoke secure user identity information (e.g., certificate) as well as alert users of such revocation upon the presentation of an identity is no longer valid. The revocation mechanism may be based on certificate revocation list (CRL) techniques or proprietary methods in which the system forces a re-authentication to take place the next time a particular user accesses the system. In this case, the system would adjust the internal time from when it trust certificates pertaining to user to not be trusted before the time tick the certificate was revoked.

In some cases, the determination as to whether there exists valid secure user identity information may be based on identity federator 120 authenticating an existing user account provided by identity provider 130. Identity provider 130 may comprise a private, proprietary service, a social network provider (e.g., such as Facebook, LinkedIn, Twitter, etc.) or other hosting services having user information database and authentication platforms that provide access based on secure authorization and/or authentication of users. In so doing, identity federator 120 integrates identity providers to provide an aggregated service of identity provisioning while also providing users with the convenience and flexibility of linking to one or more identity providers if needed.

In other cases, the determination may require middleware modules 102B, 104B to create an account that provides secure user identity information (e.g., certificate). Upon creating a new account or authenticating an existing account, secure user identity information is provisioned to user electronic devices 102, 104.

Returning to FIG. 1, upon first electronic device 102 discovering second electronic device 104, first device 102 attempts to establish a communication link with second device 104, as noted above. To this end, first device 102 may initiate a communications connection over mutually authenticated Transport Layer Security (mTLS) protocols and, during TLS negotiations, first device 102 and second device 104 may exchange their respective secure user identity information (e.g., certificate). As will be discussed below, certificates may embed the user identity in a variety of ways (e.g., obfuscated, encrypted, or plaintext).

In this manner, electronic devices can determine if a discovered electronic device holds the same secure user identity information as itself (i.e., self-property). Electronic devices may then expose this knowledge to applications, via middleware modules, by providing an attribute to each discovered electronic device indicating whether it is a device associated with the same user.

It will be appreciated that the secure user identity information associated with the user's own electronic devices, such as, electronic devices 102, 104, may comprise a certificate, token, or other suitable form. For example, the secure user identity information could take the form of an x.509 certificate or an attribute within the certificate. Regardless of form, such secure information contains or embeds data representative of the user in order for electronic devices to determine self-property. For example, x.509 certificate is capable of embedding the user identity or embedding a derived/transformed replica of the user identity.

Thus, in certain embodiments, the user identity information may contain user-related data, such as, email address information, names, usernames, telephone/address information, passwords, and combinations thereof, or may include unique reference number identifier, such as, globally unique identifiers (GUIDs) or universally unique identifier (UUIDs). Equally notable, a user may also have one or more identities, such as, a private identity, corporate identity, enterprise identity, educational identity, etc.

Moreover, the user identity information that is contained in the certificate may be embedded as clear text. In some embodiments, the contained user identity information may be subjected to a hashing function that generates obfuscated user id, such as, for example, obfuscated ID=H(user ID), where H is a 1-way hashing function. Alternatively or in addition to, the contained user identity information may be subjected to an encryption process, such as, for example, encrypted ID=Ek(user ID), where E is a symmetric or asymmetric cipher employing key k. Generally, the contained user identity information may be transformed, such as, for example, ID'=f(p1, p2, . . . , pn, user ID), where pi is the ith parameter to a multi-variable transformation function f of the user ID. These parameters are to be communicated out of band between initiator and responder device.

Figure 2A:
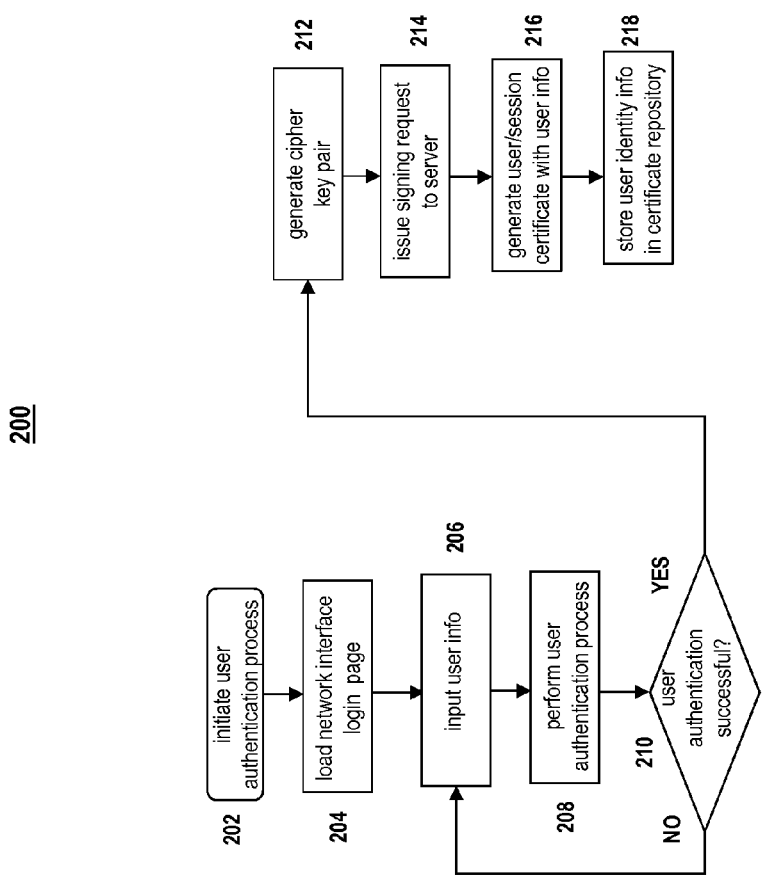
FIG. 2A depicts a functional flow diagram of a process for establishing user identities relative to user devices, in accordance with various embodiments of the present disclosure.

Turning to FIG. 2A, this figure depicts a functional flow diagram of process 200 directed to establishing secure user identities to be used relative to user devices, in accordance with various embodiments of the present disclosure. At block 202, a user desiring to establish a secure user identity information certificate initiates process 200 on an electronic device, such as, second electronic device 104. Alternatively or in addition to, as will be described in greater detail below, the initiation may be triggered upon determination that the previously-registered secure user identity information is not valid (e.g., time expiration, update required, etc.).

Either way, such initiation may be executed by invoking the logic of middleware module 104B to communicate with identity federator 120. That is, at block 204, second electronic device 104 requests identity federator 120 to provide access information (e.g., URL) regarding its login page and, upon receiving the access information, second electronic device 104 loads the login access page of network interface 120A.

At block 206, the user may input certain user-related information, including information that may be confirmed by identity provider 130 and at block 208, process 200 performs user authentication in conjunction with identity federator 120. Such authentication may comprise comparisons of the user-related information with information provided by identity provider 130, such as, for example, user email addresses, names, usernames, telephone/address information, user profiles, credentials, passwords, GUIDs, UUIDs, and combinations thereof.

At block 210, process 200 determines if the user authentication is successful and if not, process 200 returns to block 206 prompting the user to input other or additional user-related information. If user authentication is successful, process 200 advances to block 212 where a cipher key pair, such as, for example, a private and public key pair in accordance with x.509 standards. At block 214, process 200 issues a request to the identity federator 120 server for confirmation while providing the public key and proof of possession of the private key. In response, at block 216, identity federator 120 verifies that the public/private key pair are associated or related to each other and generates a secure user identity information certificate that contains user identity information. As noted above, the user identity information embedded in the secure certificate may take the form of clear text, obfuscated ID, encrypted ID, or some transformation of the user identity information.

At block 218, process 200 forwards the secure user identity information certificate to second electronic device 104 which is, in turn, stored in the certificate repository 104C of device 104. In this manner, process 200 authenticates the user and provisions second electronic device 104 with the secure user identity information as provided by the secure user identity information certificate. As such, second electronic device 104 will employ the secure user identity information certificate during the discovery process to identify devices belonging to the same user as well as identity itself with potential peer devices.

Figure 2B:
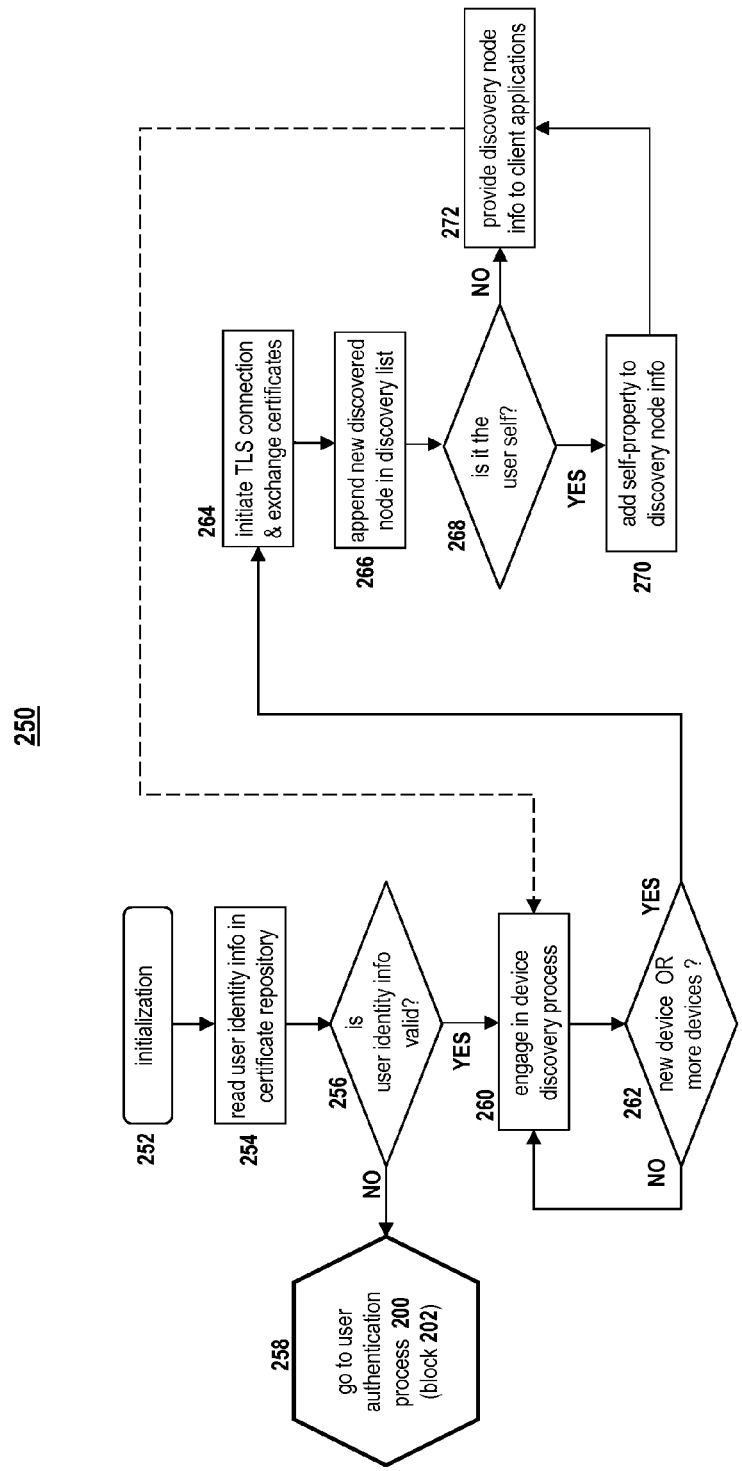
FIG. 2B depicts a functional flow diagram of a process for managing user identities relative to user devices, in accordance with various embodiments of the present disclosure.

Turning to FIG. 2B, this figure depicts a functional flow diagram of process 250 directed to managing user identities relative to user devices, in accordance with various embodiments of the present disclosure. At block 252, process 250 commences with the initialization of a user device, such as, for example, second electronic device 104. It will be appreciated that such initialization may comprise a number of operations, such as, turning on the device, initializing relevant data structures, confirming status of available radio technologies, etc.

At block 254, process 250 accesses the secure user identity information certificate stored in repository 104C of user electronic device 104 and reads the secure user identity information embedded in the certificate, representative of an authenticated user and an identity provision. At block 256, process 250 determines whether there exists a current valid secure user identity information certificate in repository 104C. If no secure user identity information certificate is present or the certificate has expired, process 250 advances to block 258, which invokes initiation of process 200 to establish current secure user identities, as discussed above.

If the secure user identity information certificate is valid, process 250, at blocks 260, 262, enables user electronic device 104 to engage in an ongoing discovery process to determine potential peer devices that may be seeking to communicate with device 104. It will be appreciated that, depending on the wireless transport technologies employed, device discovery may be performed in a variety of different ways. For example, in WiFi implementations where devices may be connected to the same network access point (AP), user electronic device 104 may advertise its endpoints via a multicast method, such as Simple Service Discovery Protocol (SSDP), multicast Domain Name System (mDNS) or other methods, to notify other devices how they can communicate with device 104. In BlueTooth implementations, user electronic device 104 would advertise its hardware address in Service Discovery Protocol (SDP) record along with an RF communication channel (RFCOMM).

Upon discovering a new device or an additional device that is capable of communicating with user electronic device 104 and also armed with the information necessary to connect to these devices, process 250 initiates a transport layer security (TLS) connection at block 264 between user device 104 and the discovered device. During the TLS connection handshaking procedures, user device 104 and the discovered device exchange secure user identity information certificates which, as noted above, includes embedded user identity information (e.g., obfuscated, encrypted or plaintext) and the devices validate the certificates and their respective contents and properties.

For each new device found, process 250 appends, at block 266, a new discovered node and associated information to a discovery list that chronicles the identity and information for all discovered devices that user electronic device 104 may connect to. Discovery list may contain attributes such as, user identity, usernames, list of installed applications, profile information, profile pictures, avatars, email address, etc. and, as discussed below, whether the discovered device contains self-property. The discovery list may be stored locally on the device in volatile memory or in any other suitable memory. Because discovery is a background process that may continue to occur periodically, process 250 may return back to block 260 to continue discovering, as indicated by the dashed arrow in FIG. 2B.

At block 268, process 250 determines whether the user identity information of both, user device 104 and the discovered device, are the same. That is, if obfuscation or encryption is applied to the user identity information, the local identities are transformed to reveal the user identity information and compared to that received from the other device. If the identities are the same, the self-property is met indicating that both devices belong to the same user and the self-property designation is appended to the discovered node as an attribute in the discovery list, at block 270. And, at block 272, the devices are provided with access to, and sharing of, the discovered node information, such as, installed applications, profile information, etc.

It will be appreciated that, by virtue of a user device and a discovered device being associated with the same user, subsequent communications may be expedited. That is, the number of actions required to consummate transactions between the two devices may be reduced, as explicit actions on the responder side may no longer be required. For example, explicit acceptance/rejection of incoming connection requests by the responder over the TLS connection may no longer be required.

If the identities are not the same (i.e., self-property is not met), indicating that the discovered device does not belong to the same user as user device 104, then process 250 advances to block 272 in which the devices are provided with access to, and sharing of, the discovered node information to enable communication between the applications of user device 104 and the discovered device. However, unlike the case in which self-property is met, in this case, subsequent communications with the discovered device may still require explicit actions by the discovered device to requests initiated by user device 104.

In this manner, process 250 effectively manages user identities for devices capable of communicating with each other. As such, electronic devices may be able to identify and automatically recognize users' own electronic devices from a set of electronic devices discovered across a variety of network transport channels and effect communications and exchange data accordingly, thereby making the connectivity experience more streamlined and more user-centric.

It will be appreciated that the electronic devices described herein may further include a display device, input devices, a memory, a system-on-chip (SoC) chipset, a communication module, transceiver circuitry, and antenna. The devices may also include a bus and/or other interconnection means to connect and communicate information between various components or units of the device.

Along these lines, the display device may be configured to display information to a user and may comprise a liquid crystal display (LCD), a light emitting diode (LED)-based display, or any other flat panel display, or may use a cathode ray tube (CRT). The input devices may include alphanumeric and other keys which may be inputted via a keyboard, touch screen (e.g., with haptics or tactile feedback), speech input, eye tracking input, brain monitoring systems or other comparable input mechanism. The input information received through one or more of the input devices may be communicated to a processor of the SoC, e.g., via a bus, for further processing. Another type of the input device may include a cursor control device, such as a mouse, a trackball, or cursor direction keys to communicate direction information and command selections, e.g., to the SoC and to control cursor movement on the display device.

The memory of the electronic devices may be a dynamic storage device configured to store information and instructions to be executed by processors of the SoC and/or other processors (or computing units). The memory may also be used to store temporary variables or other intermediate information during execution of instructions by the processors. Some or all of the memory may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. The device may also include read only memory (ROM) and/or other static storage device configured to store static information and instructions for processors of the SoC and/or other processors (or computing units). Further, the device may include a magnetic disk, optical disc or flash memory devices to store information and instructions.

In some embodiments, the SoC is part of a core processing or computing unit of the subsystem device, and is configured to receive and process input data and instructions, provide output and/or control other components in accordance with embodiments of the present disclosure. The SoC may include a microprocessor, a memory controller, a memory and peripheral components. The microprocessor may further include a cache memory (e.g., SRAM), which along with the memory of the SoC may be part of a memory hierarchy to store instructions and data. The microprocessor may also include one or more logic modules such as a field programmable gate array (FPGA) or other logic array. Communication between the SoC's microprocessor and memory may be facilitated by the memory controller (or chipset), which may also facilitate in communicating with the peripheral components, such as counter-timers, real-time timers and power-on reset generators. The SoC may also include other components including, but not limited to, timing sources (e.g., oscillators and phase-locked loops), voltage regulators, and power management circuits.

In some embodiments, the device implementing is configured to communicate with other devices or systems directly or via one or more networks using a communication module. The communication module may include necessary and typical hardware, software and/or firmware modules, e.g., related to a modulator, a demodulator, a baseband converter, a channel codec, and/or other components, implemented therein to enable the device for wireless communication. As such, the communication module is able to wirelessly transmit and receive data and messages in form of radio frequency (RF) signals through an antenna. In some embodiments, the communication module is designed and configured to support communication based on one or more communication standards and protocols including, but not limited to, Wi-Fi, Wi-Gi, Bluetooth, GSM, CDMA, GPRS, 3G or 4G (e.g., WiMAX, LTE) cellular standards, Wireless USB, satellite communication, and Wireless LAN. Additionally, or alternatively, the communication module may also be configured for wired communication, e.g., based on the Ethernet standard, and as such, may be coupled to an appropriate network interface of the device.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

EXAMPLES

The following examples pertain to numerous embodiments, consistent with the various aspects and principles of the present disclosure.

Example 1 is a system to manage electronic devices that includes an authenticating entity configured to authenticate users and provide secure user identity data based on user information; a first electronic device configured to wirelessly communicate with other electronic devices, the first electronic device including: memory configured to store first secure user identity data provisioned to the first electronic device by the authenticating entity; a communication module configured to discover a second electronic device and initiate a wireless connection with the discovered second electronic device, the second electronic device provisioned with second secure user identity data; logic configured to have the first and second electronic devices exchange their respective first and second secure user identity data and validate the exchanged second secure user identity data; and a discovery list that stores attributes of the second electronic device based on the exchanged second secure user identity data, wherein, the logic further determines whether the first and second electronic devices are associated with the same user based on the exchanged second secure user identity data and, upon determining that the first and second electronic devices are associated with the same user, the logic adds self-property to the attributes of the second electronic device in the discovery list.

In Example 2, the subject matter of Example 1 may optionally include that upon determining that either one or both of the first and second secure user identity data is invalid, the logic is further configured to initiate an authentication process with the authenticating entity.

In Example 3, the subject matter of Example 1 may optionally include that the addition of the self-property to the attributes of the second electronic device reduces the number of actions required to consummate transactions between the first and second electronic devices.

In Example 4, the subject matter of Example 1 may optionally include that the first electronic device further comprises a middleware module configured to exchange information with the authenticating entity to authenticate the first electronic device, receive the first secure user identity data provisioned to the first electronic device, and initiate storage of the first secure user identity data in memory.

In Example 5, the subject matter of Example 1 may optionally include that the authenticating entity includes a network interface to enable users to create account(s), review their account(s), determine what electronic devices are associated/registered with the user account(s), determine what applications are on the associated electronic devices, add/delete associated electronic devices, and/or determine status of secure user identity information.

In Example 6, the subject matter of Example 1 may optionally include that the authenticating entity authenticates users based, in part, on user-provided information and user-related information provided by a social network entity.

In Example 7, the subject matter of Example 1 may optionally include that the first and second secure user identity data are configured as certificates or tokens. And, in Example 8, the certificates or tokens include email address information, names, usernames, telephone/address information, passwords, globally unique identifiers (GUIDs), universally unique identifier (UUIDs), or any combination thereof. And, in Example 9, the subject matter of Example 1 may also include that at least a portion of the first and second secure user identity data is embedded in the certificates or tokens as clear text information, obfuscated information, or encrypted information.

In Example 10, the subject matter of Example 1 may optionally include that the discovery list is stored in nonvolatile memory.

Example 11 is method of managing electronic devices that provides provisioning a first electronic device with first secure user identity data provided by an authenticating entity; storing the first secure user identity data in memory of the first electronic device; discovering a second electronic device and initiating a wireless connection with the discovered second electronic device, the second electronic device provisioned with second secure user identity data; exchanging, by the first and second electronic devices, exchange their respective first and second secure user identity data; validating the exchanged second secure user identity data; storing attributes of the second electronic device based on the exchanged second secure user identity data in a discovery list; and determining whether the first and second electronic devices are associated with the same user based on the exchanged second secure user identity data, wherein, upon determining that the first and second electronic devices are associated with the same user, adding self-property to the attributes of the second electronic device in the discovery list.

In Example 12, the subject matter of Example 11 may optionally provide that upon determining that either one or both of the first and second secure user identity data is invalid, initiating an authentication process with the authenticating entity.

In Example 13, the subject matter of Example 11 may optionally provide that the addition of the self-property to the attributes of the second electronic device reduces the number of actions required to consummate transactions between the first and second electronic devices.

In Example 14, the subject matter of Example 11 may optionally provide that the first electronic device further comprises a middleware module configured to exchange information with the authenticating entity to authenticate the first electronic device, receive the first secure user identity data provisioned to the first electronic device, and initiate storage of the first secure user identity data in memory.

In Example 15, the subject matter of Example 11 may optionally provide that the authenticating entity includes a network interface to enable users to create account(s), review their account(s), determine what electronic devices are associated/registered with the user account(s), determine what applications are on the associated electronic devices, add/delete associated electronic devices, and/or determine status of secure user identity information.

In Example 16, the subject matter of Example 11 may optionally provide that the authenticating entity authenticates users based, in part, on user-provided information and user-related information provided by a social network entity.

In Example 17, the subject matter of Example 11 may optionally provide that the first and second secure user identity data are configured as certificates or tokens. And, in Example 18, the certificates or tokens include email address information, names, usernames, telephone/address information, passwords, globally unique identifiers (GUIDs), universally unique identifier (UUIDs), or any combination thereof. And, in Example 19, the subject matter of Example 11 may also provide that at least a portion of the first and second secure user identity data is embedded in the certificates or tokens as clear text information, obfuscated information, or encrypted information.

In Example 20, the subject matter of Example 11 may optionally provide that the discovery list is stored in nonvolatile memory.

Example 21 is a computer-readable medium comprising computer-readable instructions physically embodied thereon which, when executed by a processor, causes the processor to perform a method that provides provisioning a first electronic device with first secure user identity data provided by an authenticating entity; storing the first secure user identity data in memory of the first electronic device; discovering a second electronic device and initiating a wireless connection with the discovered second electronic device, the second electronic device provisioned with second secure user identity data; exchanging, by the first and second electronic devices, exchange their respective first and second secure user identity data; validating the exchanged second secure user identity data; storing attributes of the second electronic device based on the exchanged second secure user identity data in a discovery list; and determining whether the first and second electronic devices are associated with the same user based on the exchanged second secure user identity data, wherein, upon determining that the first and second electronic devices are associated with the same user, adding self-property to the attributes of the second electronic device in the discovery list.

In Example 22, the subject matter of Example 21 may optionally provide that upon determining that either one or both of the first and second secure user identity data is invalid, initiating an authentication process with the authenticating entity.

In Example 23, the subject matter of Example 21 may optionally provide that the addition of the self-property to the attributes of the second electronic device reduces the number of actions required to consummate transactions between the first and second electronic devices.

In Example 24, the subject matter of Example 21 may optionally provide that the first electronic device further comprises a middleware module configured to exchange information with the authenticating entity to authenticate the first electronic device, receive the first secure user identity data provisioned to the first electronic device, and initiate storage of the first secure user identity data in memory.

In Example 25, the subject matter of Example 21 may optionally provide that the authenticating entity includes a network interface to enable users to create account(s), review their account(s), determine what electronic devices are associated/registered with the user account(s), determine what applications are on the associated electronic devices, add/delete associated electronic devices, and/or determine status of secure user identity information.

In Example 26, the subject matter of Example 21 may optionally provide that the authenticating entity authenticates users based, in part, on user-provided information and user-related information provided by a social network entity.

In Example 27, the subject matter of Example 21 may optionally provide that the first and second secure user identity data are configured as certificates or tokens. And, in Example 28, the certificates or tokens include email address information, names, usernames, telephone/address information, passwords, globally unique identifiers (GUIDs), universally unique identifier (UUIDs), or any combination thereof. And, in Example 29, the subject matter of Example 21 may also provide that at least a portion of the first and second secure user identity data is embedded in the certificates or tokens as clear text information, obfuscated information, or encrypted information.

In Example 30, the subject matter of Example 21 may optionally provide that the discovery list is stored in nonvolatile memory.

Example 31 is a system to manage electronic devices that includes an authenticating entity configured to authenticate users and provide secure user identity data based on user information; a first electronic device configured to wirelessly communicate with other electronic devices, the first electronic device including: memory configured to store first secure user identity data provisioned to the first electronic device by the authenticating entity; a communication module configured to discover a second electronic device and initiate a wireless connection with the discovered second electronic device, the second electronic device provisioned with second secure user identity data; logic configured to have the first and second electronic devices exchange their respective first and second secure user identity data and validate the exchanged second secure user identity data; and a discovery list that stores attributes of the second electronic device based on the exchanged second secure user identity data, wherein, the logic further determines whether the first and second electronic devices are associated with the same user based on the exchanged second secure user identity data and, upon determining that the first and second electronic devices are associated with the same user, the logic adds self-property to the attributes of the second electronic device in the discovery list.

In Example 32, the subject matter of Example 31 may optionally include that upon determining that either one or both of the first and second secure user identity data is invalid, the logic is further configured to initiate an authentication process with the authenticating entity.

In Example 33, the subject matter of Example 31 may optionally include that the addition of the self-property to the attributes of the second electronic device reduces the number of actions required to consummate transactions between the first and second electronic devices.

In Example 34, the subject matter of Example 31 may optionally include that the first electronic device further comprises a middleware module configured to exchange information with the authenticating entity to authenticate the first electronic device, receive the first secure user identity data provisioned to the first electronic device, and initiate storage of the first secure user identity data in memory.

In Example 35, the subject matter of Example 31 may optionally include that the authenticating entity includes a network interface to enable users to create account(s), review their account(s), determine what electronic devices are associated/registered with the user account(s), determine what applications are on the associated electronic devices, add/delete associated electronic devices, and/or determine status of secure user identity information.

In Example 36, the subject matter of Example 31 may optionally include that the authenticating entity authenticates users based, in part, on user-provided information and user-related information provided by a social network entity.

In Example 37, the subject matter of Example 31 may optionally include that the first and second secure user identity data are configured as certificates or tokens. And, in Example 38, the certificates or tokens include email address information, names, usernames, telephone/address information, passwords, globally unique identifiers (GUIDs), universally unique identifier (UUIDs), or any combination thereof. And, in Example 39, the subject matter of Example 31 may also include that at least a portion of the first and second secure user identity data is embedded in the certificates or tokens as clear text information, obfuscated information, or encrypted information.

In Example 40, the subject matter of Example 31 may optionally include that the discovery list is stored in nonvolatile memory.

Example 41 is method of managing electronic devices that provides provisioning a first electronic device with first secure user identity data provided by an authenticating entity; storing the first secure user identity data in memory of the first electronic device; discovering a second electronic device and initiating a wireless connection with the discovered second electronic device, the second electronic device provisioned with second secure user identity data; exchanging, by the first and second electronic devices, exchange their respective first and second secure user identity data; validating the exchanged second secure user identity data; storing attributes of the second electronic device based on the exchanged second secure user identity data in a discovery list; and determining whether the first and second electronic devices are associated with the same user based on the exchanged second secure user identity data, wherein, upon determining that the first and second electronic devices are associated with the same user, adding self-property to the attributes of the second electronic device in the discovery list.

In Example 42, the subject matter of Example 41 may optionally provide that upon determining that either one or both of the first and second secure user identity data is invalid, initiating an authentication process with the authenticating entity.

In Example 43, the subject matter of Example 41 may optionally provide that the addition of the self-property to the attributes of the second electronic device reduces the number of actions required to consummate transactions between the first and second electronic devices.

In Example 44, the subject matter of Example 41 may optionally provide that the first electronic device further comprises a middleware module configured to exchange information with the authenticating entity to authenticate the first electronic device, receive the first secure user identity data provisioned to the first electronic device, and initiate storage of the first secure user identity data in memory.

In Example 45, the subject matter of Example 41 may optionally provide that the authenticating entity includes a network interface to enable users to create account(s), review their account(s), determine what electronic devices are associated/registered with the user account(s), determine what applications are on the associated electronic devices, add/delete associated electronic devices, and/or determine status of secure user identity information.

In Example 46, the subject matter of Example 41 may optionally provide that the authenticating entity authenticates users based, in part, on user-provided information and user-related information provided by a social network entity.

In Example 47, the subject matter of Example 41 may optionally provide that the first and second secure user identity data are configured as certificates or tokens. And, in Example 48, the certificates or tokens include email address information, names, usernames, telephone/address information, passwords, globally unique identifiers (GUIDs), universally unique identifier (UUIDs), or any combination thereof. And, in Example 49, the subject matter of Example 41 may also provide that at least a portion of the first and second secure user identity data is embedded in the certificates or tokens as clear text information, obfuscated information, or encrypted information.

In Example 50, the subject matter of Example 41 may optionally provide that the discovery list is stored in nonvolatile memory.

Example 51 is a computer-readable medium comprising computer-readable instructions physically embodied thereon which, when executed by a processor, causes the processor to perform the method of any of examples 41-50.

Example 52 is an apparatus comprising: means for performing the method of examples 41-50.

Example 53 is a system to manage electronic devices that includes an authenticating entity configured to authenticate users and provide secure user identity data based on user information; a first electronic device configured to wirelessly communicate with other electronic devices, the first electronic device including: memory configured to store first secure user identity data provisioned to the first electronic device by the authenticating entity; a communication module configured to discover a second electronic device and initiate a wireless connection with the discovered second electronic device, the second electronic device provisioned with second secure user identity data; logic configured to have the first and second electronic devices exchange their respective first and second secure user identity data and validate the exchanged second secure user identity data; and a discovery list that stores attributes of the second electronic device based on the exchanged second secure user identity data, wherein upon determining that either one or both of the first and second secure user identity data is invalid, the logic is further configured to initiate an authentication process with the authenticating entity, and wherein, the logic further determines whether the first and second electronic devices are associated with the same user based on the exchanged second secure user identity data and, upon determining that the first and second electronic devices are associated with the same user, the logic adds self-property to the attributes of the second electronic device in the discovery list.

In Example 54, the subject matter of Example 53 may optionally include that the first electronic device further comprises a middleware module configured to exchange information with the authenticating entity to authenticate the first electronic device, receive the first secure user identity data provisioned to the first electronic device, and initiate storage of the first secure user identity data in memory.

In Example 55, the subject matter of Example 53 may optionally include that the authenticating entity includes a network interface to enable users to create account(s), review their account(s), determine what electronic devices are associated/registered with the user account(s), determine what applications are on the associated electronic devices, add/delete associated electronic devices, and/or determine status of secure user identity information.

In Example 56, the subject matter of Example 53 may optionally include that the authenticating entity authenticates users based, in part, on user-provided information and user-related information provided by a social network entity.

In Example 57, the subject matter of Example 53 may optionally include that the first and second secure user identity data are configured as certificates or tokens that include one or more of the following: email address information, names, usernames, telephone/address information, passwords, globally unique identifiers (GUIDs), universally unique identifier (UUIDs).

In Example 58, the subject matter of Example 53 may optionally include that at least a portion of the first and second secure user identity data is embedded in the certificates or tokens as clear text information, obfuscated information, or encrypted information.

Example 59 is a method of managing electronic devices that provides provisioning a first electronic device with first secure user identity data provided by an authenticating entity; storing the first secure user identity data in memory of the first electronic device; discovering a second electronic device and initiating a wireless connection with the discovered second electronic device, the second electronic device provisioned with second secure user identity data; exchanging, by the first and second electronic devices, exchange their respective first and second secure user identity data; validating the exchanged second secure user identity data; storing attributes of the second electronic device based on the exchanged second secure user identity data in a discovery list; and determining whether the first and second electronic devices are associated with the same user based on the exchanged second secure user identity data, wherein upon determining that either one or both of the first and second secure user identity data is invalid, initiating an authentication process with the authenticating entity, and wherein, upon determining that the first and second electronic devices are associated with the same user, adding self-property to the attributes of the second electronic device in the discovery list.

In Example 60, the subject matter of Example 59 may optionally include providing a middleware module configured to exchange information with the authenticating entity to authenticate the first electronic device, receive the first secure user identity data provisioned to the first electronic device, and initiate storage of the first secure user identity data in memory.

In Example 61, the subject matter of Example 59 may optionally provide that the authenticating entity includes a network interface to enable users to create account(s), review their account(s), determine what electronic devices are associated/registered with the user account(s), determine what applications are on the associated electronic devices, add/delete associated electronic devices, and/or determine status of secure user identity information.

In Example 62, the subject matter of Example 59 may optionally provide that the authenticating process performed by the authenticating entity is based, in part, on user-provided information and user-related information provided by a social network entity.

In Example 63, the subject matter of Example 59 may optionally provide that the first and second secure user identity data are configured as certificates or tokens that include one or more of the following: email address information, names, usernames, telephone/address information, passwords, globally unique identifiers (GUIDs), universally unique identifier (UUIDs).

In Example 64, the subject matter of Example 59 may optionally provide that at least a portion of the first and second secure user identity data is embedded in the certificates or tokens as clear text information, obfuscated information, or encrypted information.

Example 65 is computer-readable medium comprising computer-readable instructions physically embodied thereon which, when executed by a processor, causes the processor to perform the method of any of examples 59-64.

Example 65 is an apparatus comprising: means for performing the method of examples 59-64.

What is claimed is:

1. A system to manage electronic devices, comprising:
   a first electronic device configured to wirelessly communicate with other electronic devices, the first electronic device including:
   a first memory configured to store first secure user identity data provisioned to the first electronic device by an authenticating server, wherein the first secure user identity data is based on user-specific information;
   a physical processor configured to discover a second electronic device and initiate a wireless connection with the discovered second electronic device, the second electronic device provisioned with second secure user identity data;
   logic configured to have the first and second electronic devices exchange their respective first and second secure user identity data and validate the exchanged second secure user identity data; and a second memory to store a discovery list that includes attributes of the discovered second electronic device based on the exchanged second secure user identity data, wherein, the logic is further to determine whether the first and second electronic devices are associated with the same user based on the exchanged second secure user identity data and, upon determining that the first and second electronic devices are associated with the same user, the logic is to add in the discovery list an attribute indicating self-property designation for the discovered second electronic device, in addition to the attributes of the second electronic device in the discovery list.

2. The system of claim 1, wherein upon determining that either one or both of the first and second secure user identity data is invalid, the logic is further configured to initiate an authentication process with the authenticating server.

3. The system of claim 1, wherein the addition of the self-property attribute to the attributes of the second electronic device reduces the number of actions required to consummate transactions between the first and second electronic devices.

4. The system of claim 1, wherein the physical processor is further configured to exchange information with the authenticating server to authenticate the first electronic device, receive the first secure user identity data provisioned to the first electronic device, and initiate storage of the first secure user identity data in the first memory.

5. The system of claim 1, further comprising the authenticating server, wherein the authenticating server is configured to authenticate users and provide secure user identity data based on the user-specific information provided by a user to the authenticating server, and
wherein the authenticating server includes a network interface to enable users to create account(s), review their account(s), determine what electronic devices are associated/registered with the user account(s), determine what applications are on the associated electronic devices, add/delete associated electronic devices, and/or determine status of secure user identity information.

6. The system of claim 5, wherein the authenticating server authenticates users based, in part, on user-provided information and user-related information provided by a social network entity.

7. The system of claim 1, wherein the first and second secure user identity data are configured as certificates or tokens.

8. The system of claim 7, wherein the certificates or tokens include email address information, names, usernames, telephone/address information, passwords, globally unique identifiers (GUIDs), universally unique identifier (UUIDs), or any combination thereof.

9. The system of claim 7, wherein at least a portion of the first and second secure user identity data is embedded in the certificates or tokens as clear text information, obfuscated information, or encrypted information.

10. The system of claim 1, wherein the second memory includes nonvolatile memory.

11. A method of managing electronic devices, comprising:
provisioning a first electronic device with first secure user identity data provided by an authenticating server, wherein the authenticating server is configured to generate the first secure user identity data based on user-specific information provided by a user to the authenticating server;
storing the first secure user identity data in a first memory of the first electronic device;
discovering a second electronic device and initiating a wireless connection with the discovered second electronic device, the second electronic device provisioned with second secure user identity data;
exchanging, by the first and second electronic devices, exchange their respective first and second secure user identity data;
validating the exchanged second secure user identity data;
storing attributes of the second electronic device based on the exchanged second secure user identity data in a discovery list in a second memory; and
determining whether the first and second electronic devices are associated with the same user based on the exchanged second secure user identity data,
wherein, upon determining that the first and second electronic devices are associated with the same user, adding in the discovery list an attribute indicating self-property designation for the discovered second electronic device, in addition to the attributes of the second electronic device in the discovery list.

12. The method of claim 11, wherein upon determining that either one or both of the first and second secure user identity data is invalid, initiating an authentication process with the authenticating server.

13. The method of claim 11, wherein the addition of the self-property attribute to the attributes of the second electronic device reduces the number of actions required to consummate transactions between the first and second electronic devices.

14. The method of claim 11, providing a middleware module configured to exchange information with the authenticating server to authenticate the first electronic device, receive the first secure user identity data provisioned to the first electronic device, and initiate storage of the first secure user identity data in the first memory.

15. The method of claim 11, wherein the authenticating server includes a network interface to enable users to create account(s), review their account(s), determine what electronic devices are associated/registered with the user account(s), determine what applications are on the associated electronic devices, add/delete associated electronic devices, and/or determine status of secure user identity information.

16. The method of claim 11, wherein the authenticating process performed by the authenticating server is based, in part, on user-provided information and user-related information provided by a social network entity.

17. The method of claim 11, wherein the first and second secure user identity data are configured as certificates or tokens.

18. The method of claim 17, wherein the certificates or tokens include email address information, names, usernames, telephone/address information, passwords, globally unique identifiers (GUIDs), universally unique identifier (UUIDs), or any combination thereof.

19. The method of claim 17, wherein at least a portion of the first and second secure user identity data is embedded in the certificates or tokens as clear text information, obfuscated information, or encrypted information.

20. The method of claim 11, wherein the second memory includes nonvolatile memory.

* * * * *